(12) United States Patent
Claus et al.

(10) Patent No.: US 6,316,084 B1
(45) Date of Patent: Nov. 13, 2001

(54) TRANSPARENT ABRASION-RESISTANT COATINGS, MAGNETIC COATINGS, ELECTRICALLY AND THERMALLY CONDUCTIVE COATINGS, AND UV ABSORBING COATINGS ON SOLID SUBSTRATES

(75) Inventors: Richard O. Claus; Yanjing Liu, both of Blacksburg, VA (US)

(73) Assignee: Nanosonic, Inc., Christiansburg, VA (US)

( * ) Notice: Subject to any disclaimer, the term of this patent is extended or adjusted under 35 U.S.C. 154(b) by 0 days.

(21) Appl. No.: 09/352,683

(22) Filed: Jul. 14, 1999

(51) Int. Cl.[7] ............................. B32B 7/00; B32B 15/00
(52) U.S. Cl. ...................... 428/212; 428/216; 428/457; 428/458; 428/461; 428/469; 428/473.5; 428/689

(58) Field of Search ................................. 428/212, 213, 428/220, 332, 336, 668, 670, 678, 681, 692, 216, 457, 458, 461, 469, 473.5, 689

(56) References Cited

U.S. PATENT DOCUMENTS 6,114,099  9/2000  Liu et al. ............................. 430/324

*Primary Examiner*—Bruce Hen
*Assistant Examiner*—Ling Xu
(74) *Attorney, Agent, or Firm*—McGuireWoods LLP

(57) ABSTRACT

Abrasion and scratch protective coatings magnetic coatings, electrically and thermally conducting coatings, and UV absorbing coatings are provided by electrostatic self-assembly (ESA) of one layer of an organic or polymer molecule and one layer of inorganic clusters in a layer by layer fashion at room temperature. A combination of inorganic clusters having a particle size of preferably less than 30 nm and flexible organic molecules allows fabrication of films tens to hundreds of micrometers thick, with large pores and excellent stress relaxation.

29 Claims, 5 Drawing Sheets

TRANSPARENT ABRASION-RESISTANT COATINGS, MAGNETIC COATINGS, ELECTRICALLY AND THERMALLY CONDUCTIVE COATINGS, AND UV ABSORBING COATINGS ON SOLID SUBSTRATES

BACKGROUND OF THE INVENTION

1. Field of the Invention

The present invention generally relates to coatings that protect a solid substrate from wear and abrasion and/or which provide properties such as magnetism electrical conductivity and UV absorption. More particularly, the invention relates to the formation of a transparent, abrasion-resistant optical coating on solid plastic substrates to prevent degradation and wear due to scratches and abrasion, and a method for making same, as well as for providing coating on substrates having UV resistance, responsiveness to magnetic fields, and electrical conductivity.

2. Background Description

Polymer (i.e. plastic) materials have many special properties that make them unique and ideal for use in many applications. In particular, optically transparent plastics such as polycarbonate, CR-39® (allyl diglycol carbonate), and acrylics (for example, polymethyl methacrylate) have found various commercial advantages in that they are not only light in weight and substantially shockproof (shatter-resistant), but they are also easier to fabricate and lower in cost than inorganic glass materials. Plastics have various practical applications for the direct replacement of inorganic glass components in products such as sunglass lenses, ophthalmic lenses, automobile, truck, bus, train and airplane windows and headlight covers, camera lenses, microscope lenses, binocular lenses, telescope lenses, ski glasses, diving masks, display panels, signboards, name plates, commercial advertising displays, optical filters and windows, architectural building glazing, bar code scanner windows, reflectors, and mirrors.

However, most polymer materials suffer a serious drawback, i.e. they mar and scratch easily by physical contact with harder materials. Continuous marring and scratching result in impaired visibility and poor aesthetics, and often requires replacement of the plastic components.

Thus, highly transparent and abrasion-resistant coating for plastic substrate are of great interest and in great demand.

Several prior techniques disclose various methods to improve the abrasion wear resistance of plastic substrates (see, for example U.S. Pat. Nos. 5,679,413, 5,618,619, 5,190,807, 5,633,049, 4,544,572, 5,741,831, and 5,385,955). These patents teach that coating solutions may be spread onto the desired plastic substrates by dip, spray, spin, or flow techniques. The resulting coatings generally offer significant improvement of abrasion-resistance, but generally exhibit flow marks on the surface and an uneven coating thickness distribution that may cause undesirable optical aberrations. U.S. Pat. Nos. 4,073,967 and 4,084,021 teach that abrasion-resistant coatings form by spin dip, spray or flow methods and can be formed on smooth surfaces such as optical elements in spectacle lenses. However, the build-up of the coating material at the outer edge of the lens can cause optical aberration. These techniques are less satisfactory when they are used to coat irregular surfaces. Moreover, the application of many of the prior abrasion resistance coatings require thermally activated initiators so the plastic substrates must be exposed to elevated temperature in order to fully develop the physical properties of the coating and to remove the solvents. Such high temperature processing may significantly degrade the quality of the plastic, through the incorporation of residual stresses.

Vapor deposition techniques for coating application have also been employed. For example, U.S. Pat. No. 4,190,681 teaches a method for the vapor deposition of a top layer of silicon dioxide onto an intermediate layer of an acrylate-type polymer that has, in turn, been coated onto a polycarbonate substrate. However, this evaporative technique of applying a layer of silicon dioxide is often undesirable for several reasons, including (i) insufficient bond strength between the silicon dioxide layer and the underlying polymer layer, (ii) the resulting non-uniform surface is often characterized by pinholes, pits, and other imperfections, (iii) the difficulty to obtain uniformly thick coatings on curved or irregular or large-size substrates, (iv) the significant degradation of the plastic due to its exposure to high temperature, and (v) the spalling and cracking that occurs when the film thickness is increased beyond approximately 0.5 micrometer.

Even though some improvements in abrasion resistant coatings have been made over the abrasion resistance of uncoated plastic substrates, obtaining high quality abrasion-resistant coatings remains a major problem in industry, particularly for Ophthalmic lenses, automobile windows, and the many other areas as mentioned above. Moreover, a low-temperature process to fabricate optically transparent coating with the same abrasion resistance as inorganic glass on substrates (including plastics) of arbitrary sizes and geometries has heretofore not been developed.

SUMMARY OF THE INVENTION

It is an object of the present invention to provide novel abrasion and scratch protective, magnetic, electrically conductive, thermally conductive, UV blocking coatings on solid substrates of arbitrary sizes and geometries using room temperature and pressure processing.

It is another object of the present invention to provide a novel protective coating which imparts abrasion and scratch resistance to plastic substrates of arbitrary sizes and geometries including, but not limited to ophthalmic lenses, sunglass lenses, automobile, boats, truck, bus, train and airplane windows and headlight covers, camera lenses, microscope lenses, binocular lenses, telescope lenses, ski glasses, diving masks, display panels, signboards, name plates, commercial advertising displays optical filters, lenses, and windows, architectural building glazing, bar code scanner windows, reflectors, mirrors, and other devices.

A still further object of the present invention is to provide a novel protective coating which imparts abrasion and scratch resistance to solid substrates and other relatively smooth solid surfaces including metals, alloys, semiconductors, dielectrics, ceramics, and carbon surfaces.

Another object of the present invention is to provide a novel protective coating that imparts not only abrasion and scratch resistance, but also UV light irradiation-resistance and control of the refractive index of the outermost coating layer, to solid substrates and other relatively smooth solid surfaces.

The inventive coating comprises multiply oppositely charged layers having at least two materials held together and held to a substrate by electrostatic charges. Each layer has a thickness between 0.1 nm to 100 nm and the aggregate thickness of the multiple oppositely charged layers being 1 nm to 1000 μm thick.

Accordingly, several advantages of the present invention are:

a) the manufacture of the coatings does not require the use of any compounding facility, high temperature or vacuum processing;

b) avoidance of volatile organic compounds, specialized process gases and clean room environmental conditions;

c) room temperature processing eliminates the formation of residual stresses that may be created by processing at high temperature, such residual stresses may degrade the mechanical performance of polymer substrate materials;

d) the combination of tough nanosized inorganic clusters (particle size less than 30 nm is preferred) and flexible organic (or polymer) molecules makes it possible to fabricate composite films tens to hundreds of micrometers in thickness with large pores, excellent stress relaxation and controlled or graded refractive index;

e) the solution-based coating process removes virtually all constrains on substrate size, shape and species;

f) the molecular-level uniformity of the thickness of the coatings formed by solution processing eliminates the effects of optical aberrations introduced by the nonuniform thickness of coatings produced by other methods;

g) the use of clusters having particle sizes less than 30 nm eliminates significant light scattering, and results in coatings that are uniform in properties at the nanometer level; and h) the molecular-level uniformity of the thickness of the coatings formed by the solution processing allows the formation of individual multilayer segments having parallel surfaces.

BRIEF DESCRIPTION OF THE DRAWINGS

The foregoing and other objects, aspects and advantages will be better understood from the following detailed description of the preferred embodiments of the invention with reference to the drawings, in which.

DETAILED DESCRIPTION OF A PREFERRED EMBODIMENT OF THE INVENTION

By the present invention, a process for preparing hard and abrasion-resistant coatings is presented. The coating is formed by the electrostatic self-assembly of one layer of an organic or polymer molecule and one layer of inorganic clusters (particle size less than 30 nm preferred) in a layer-by-layer fashion at room temperature. The combination of ultrafine (or ultrasmall) inorganic clusters (particle size less than 30 nm preferred) and flexible organic (or polymer) molecules makes it possible to fabricate films tens to hundred of micrometers in thickness, with large pores and excellent stress relaxation. The combination also allows control of coating refractive index. This process has been used to fabricate protecting coatings employing nanosized clusters of $Al_2O_3$, $TiO_2$, $ZrO_2$, $SiO_2$, $Al_2O_3/SiO_2$, $Al_2O_3/ZrO_2$, $ZrO_2/SiO_2$ or $C_{60}$ with organic (or polymer) molecules sandwiched between clusters. Nanoindentation measurement results demonstrate that the hardness of the coatings can be adjusted based on the composition and the ratio of organic to inorganic molecules.

The process of the present invention includes the steps of: 1) providing a substrate; 2) modifying the substrate, or avoiding the modification step; 3) dipping the substrate into an inorganic cluster solution; 4) rinsing the substrate with solution; 5) dipping the substrate into a polymer solution; 6) rinsing the substrate with solution; 7) repeating the steps of 3) to 6) to yield a multilayer coated substrate. The solutions in step 7) can be the same as, or different from the solutions used in steps 3) to 6), or the mixture of two or more clusters or inorganic, organic or polymer molecules. The resulting multilayer coatings can consist of different blocks of inorganic clusters and polymer (or organic molecules).

Clusters, unlike molecules, are not chemically complete substances, and may vary in size. In the preferred embodiment, the clusters have sizes smaller than 30 nm. Cluster size may be used to control abrasion resistance, hardness, optical transmission and refractive index.

The coatings of the present invention exhibit the following properties:

1) hardness ranges from 1 to 8 G Pa based on the design of the cluster size, species, and ratio of the composition;

2) optical transparency greater than 90% throughout the visible spectrum;

3) thickness of the coatings can be varied from a few nanometer to tens and hundreds of micrometers;

4) no significant hazing or optical aberrations;

5) strain needed to microcrack the coating of more than 1%;

6) no limitation on the species of the solid substrates to be coated due to the room temperature solution application process; and 7) refractive index of the entire coating or separate segments of the coating may be varied, typically from approximately 1.3 to above 2.0, by incorporation of clusters with different refractive index properties.

Figure 1:
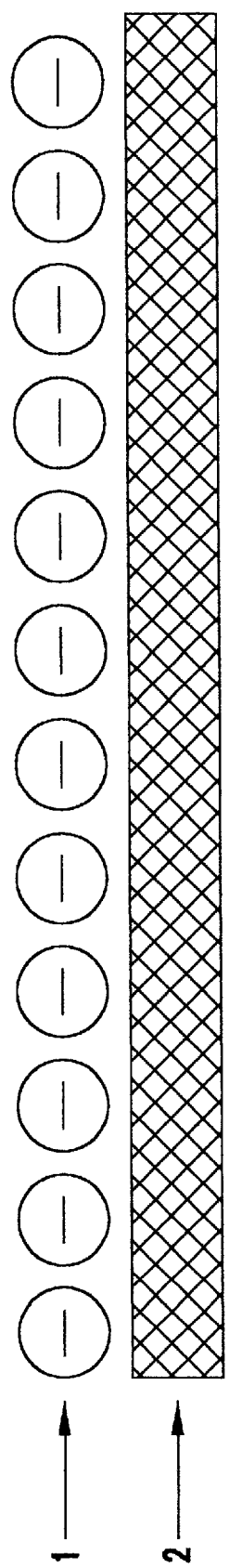
FIG. 1 is a cleaned substrate material with a net electrical charge on the molecular level at the surface.

Referring now to the drawings, and more particularly to FIG. 1, there is shown a plastic substrate 2, which has been cleaned to remove surface impurities and to create a region of net charge 1 at the molecular surface of the substrate. In FIG. 1, the net charge region is shown as negative charge but in general it may be either negative charge or positive charge.

Figure 2:
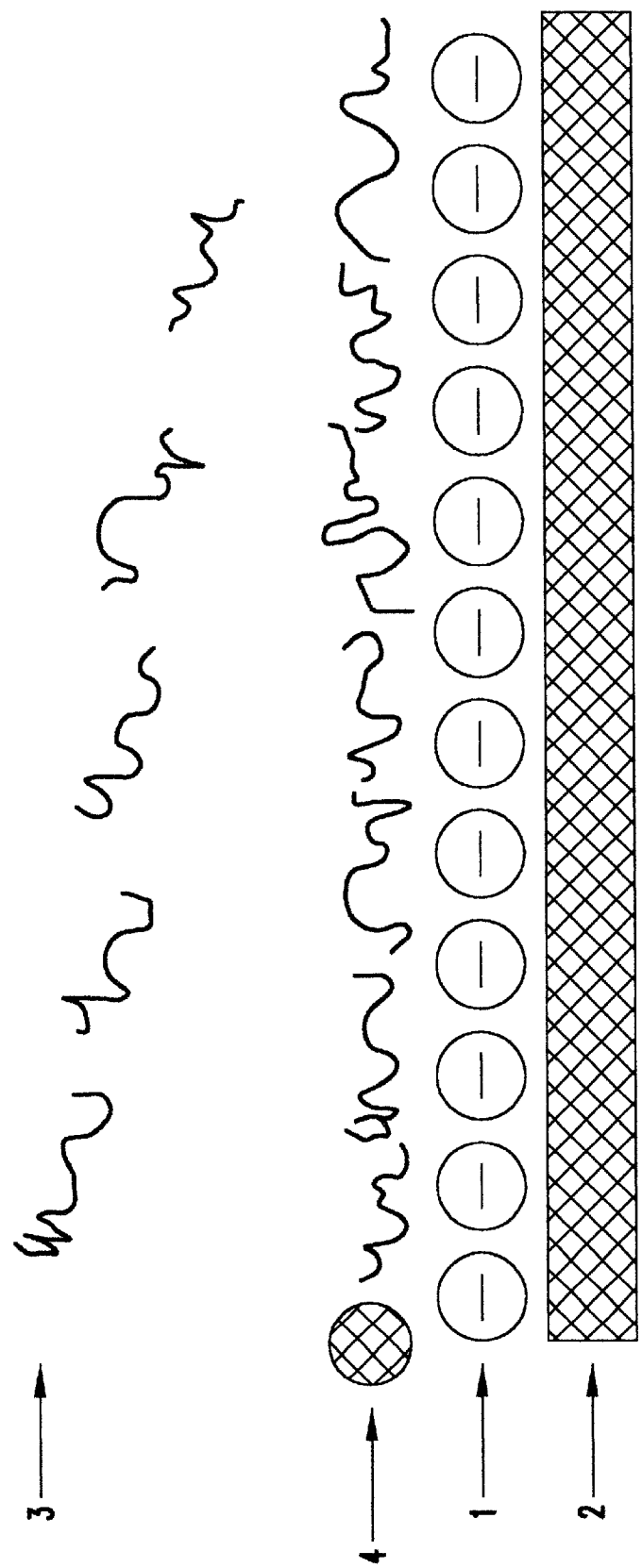
FIG. 2 shows the substrate and a layer of polymer molecules attached to the outermost surface.

Referring now to FIG. 2 there is shown the substrate 2, and net charge region 1, and cationic polymer molecules 3 that form a layer 4 on the substrate. Here, the polymer molecules are representative, and may be instead non-molecular clusters or other similarly sized materials with net positive outermost charge distributions.

Figure 3:
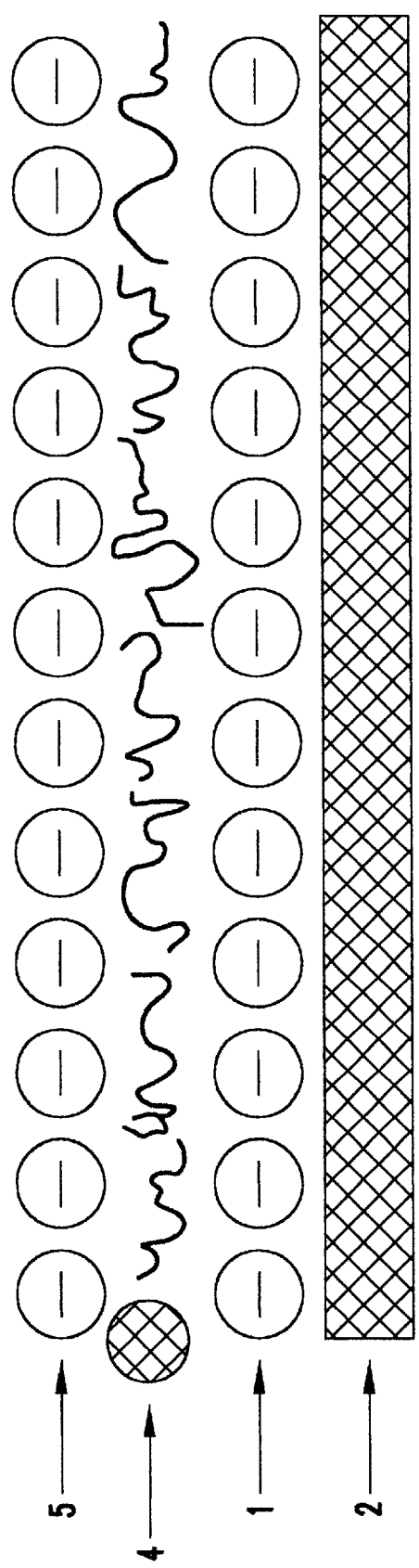
FIG. 3 shows the substrate, the layer of polymer molecules, and an overlying layer of clusters.

FIG. 3 shows the substrate 2, the first layer of polymer molecules 4, and an addition monolayer of negatively charged clusters 5. The negatively charged clusters are shown as approximately spherical particles, but in general they may have different sizes, shapes and structures depending upon the method of their synthesis.

Figure 4:
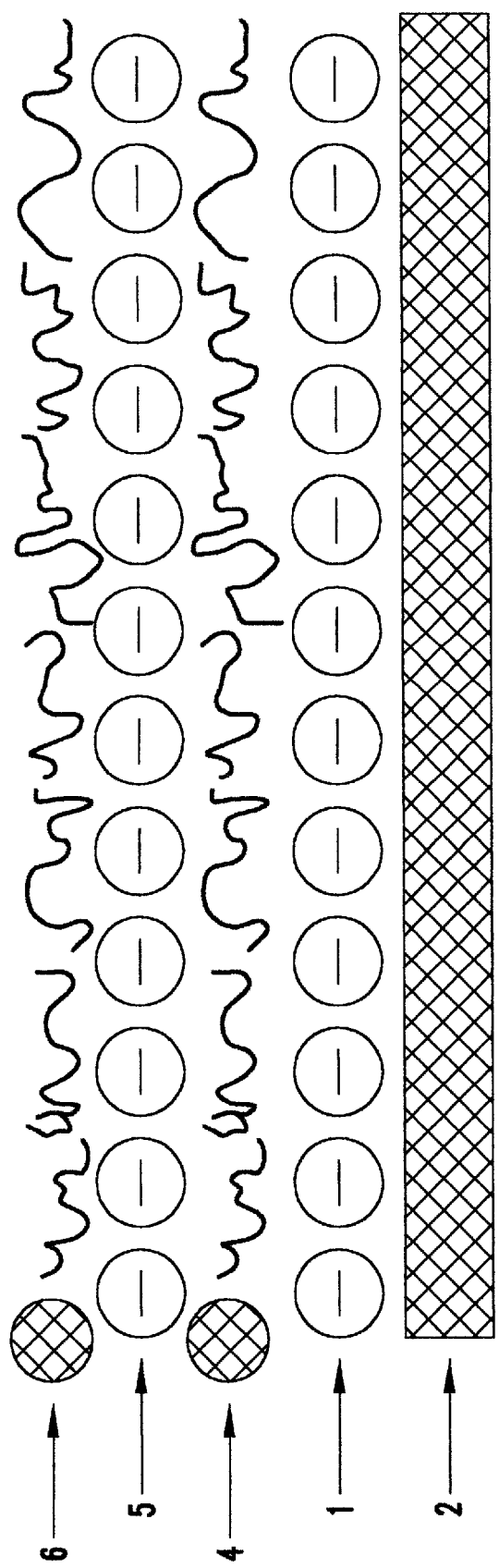
FIG. 4 shows the substrate, the layer of polymer molecules, said overlying layer of clusters and a second layer of polymer molecules.

FIG. 4 shows the further addition of a second layer of polymer molecules 6, on top of the layer of clusters shown in FIG. 3. As in FIG. 2, these molecules have positive charges so are cationic. Although the molecules 6 are shown as polymers, they may in general be clusters of positive charge or clusters of negative charge. Additionally, alternating layer of cluster and polymer molecules, or cluster and cluster, or cluster and other molecules, may be added sequentially, where each layer has a charge opposite to that of the previously deposited layer. As long as this charge reversal requirement is satisfied, the materials in the layers may be varied throughout the composite multilayer system, allowing control of multiple mechanical optical and electromagnetic properties.

It should be understood that this invention contemplates adding multiple layers of oppositely charged materials on top of each other in layer-by-layer fashion. The preferred aggregate thickness will vary depending on the materials used in the layers and on the application. The aggregate thickness preferably ranges from 10–10,000 layers or from 10 nm to 1000 $\mu$m. The layers can be comprised of charged polymer materials, "Buckeyballs", metals, ceramics, oxides, etc. While FIG. 4 shows a negatively charged layer adhering to a positively charged substrate, it should be understood that the reverse arrangement is also with in the scope of the invention. As discussed below, sequentially into baths containing the charge particles or polymers. The substrate on which the layers are applied can be made of naturally charge material, or can be treated to produce a charged surface (e.g. chemical exposure, etching, plasma, etc.)

EXAMPLES

Magnetic Film

A mixture of aqueous solution of $FeCl_3$ (40 mL, 1 M) and $FeCl_2$ (10 mL, 2 M) are dissolved in aqueous solution of 2 m HCl and then poured into a well-stirred ammonia solution $NH_4OH$ (500 mL, 0.7 M). The instantaneously formed black precipitate is separated by centrifugation without washing with water. Then, the precipitate is dissolved and agitated in an aqueous solution of poly(dillayldimethylammonium chloride) (PDDA) at a pH of 8.5. the coagulation and precipitation of these particles are prevented by the adsorption of cationic polyelectrolyte (PDDA). The resulting dark brown $Fe_3O_4$ solution is stable over a period of months and is sensitive to the pH values of the water solution. The typical size of the PDDA-coated magnetite particles is about 10 nm as demonstrated by transmission electron microscopy.

A thermoplastic polyimide precursor, polyamic acid salt (PAATEA) is used as anionic electrolyte, and is inserted as a protective layer between alternating iron oxide particle layers.

The fabrication of (PDDA: $Fe_3O_4$)/PAATEA monolayer and multilayer films are carried out as follows. A cleaned substrate, for example, a single crystal silicon, is dipped into cationic solution of (PDDA: $Fe_3O_4$)/$H_2O$(3/1.5/50,w/w) with a pH of 8.5 for a minute, followed by a thorough washing with water. Then, the slide is immersed in a 1% (w/w) aqueous solution of PAATEA with a pH of 8.5 for a minute, and rinsed with water. By repetition of this two step process in a cyclic fashion, a multilayer magnetic film containing $Fe_3O_4$ nanoparticles are obtained.

Figure 5B:
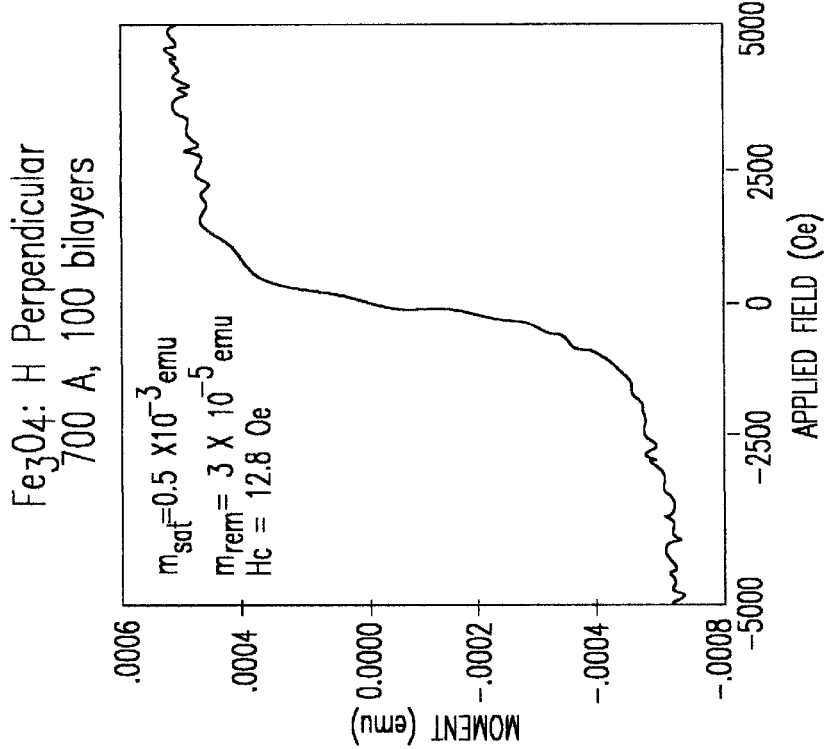
FIG. 5B is a graph showing the magnetic properties of a ESA formed film for a field applied perpendicular to the plane of a substrate.
Figure 5A:
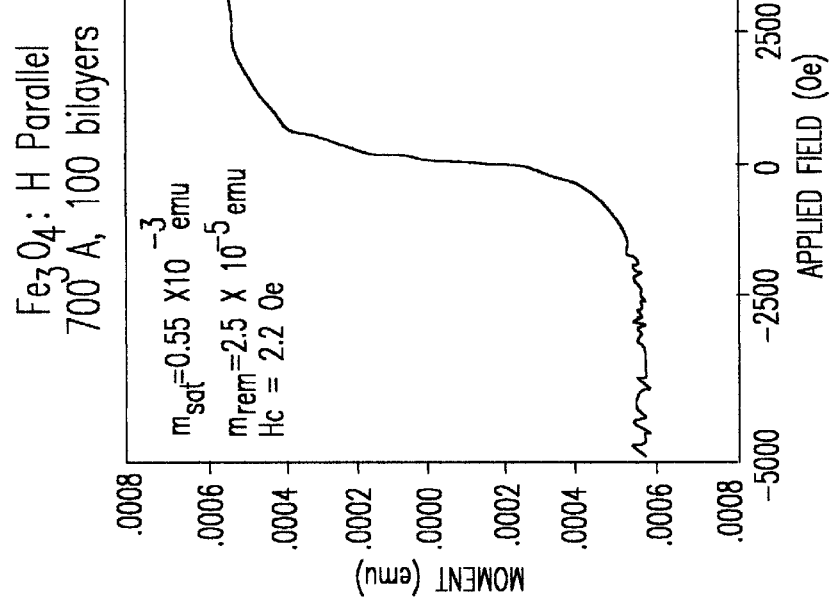
FIG. 5A is a graph showing the magnetic properties of a ESA formed film for a field applied parallel to the plane of a substrate.

Vibrating sample magnetometry (VSM) was used to analyze the magnetic properties of the Electrostatic self-assembly-formed thin films. FIG. 5 shows the magnetic moment as a function of the amplitude of magnetic fields applied parallel and perpendicular to the plane of the substrate. The low coercivity and remanence and negligible hysteresis are consistent with a superparamagnetic description for nanoparticle behavior. The magnetoresistance ratio, $\Delta\rho/\rho$ was measured at room temperature. A maximum in $\Delta\rho/\rho$ of 25% is clearly observed.

While this example shows the preparation of iron nanoparticles layered between polymer layers to produce magnetic thin films it should be understood that other magnetizable cluster materials such as Co, $Fe_2O_3$, Fe, Mn, organic magnetic compounds could be used in the practice of this invention, and that a wide variety of polymers and other materials (e.g., oppositely charged ceramic layers) could be employed.

Conducting Films
Pt Films with Bulk Metal Conductivity

Potassium tetrachloro platinate ($K_2PtCl_4$) dissolved in aqueous solution containing poly(dillaldimethylammonium chloride) (PDDA) with a molar ratio of Pt: polymer of 1:5 was reduced by bubbling first with argon, and hydrogen gas, vigorously, each for 15 minutes. A change of color from light yellow to dark brown was immediately observed. The PDDA-coated Pt cluster size in the dispersion is less than 1 nm as by particle size measurement and confirmed by ellipsometry measurement. A polymer dye, poly s-119, was used as an anionic electrolyte.

The film fabrication process is the same as discussed above for magnetic films.

Resistability measurements were performed in a 4-probe resistivity meter. Three samples of 15 bilayers, 20 bilayers and 25 bilayers of Pt: PDDA/poly s-119 films demonstrated the resistivities of $7.86 \times 10^{-6}$, $7.90 \times 10^{-6}$, and $7.62 \times 10^{-6}$ $\Omega$-cm, respectively.

Au Films with Bulk Metal Conductivity $HAuCl_4$ ($9 \times 10^{-4}$ mol) dissolved in aqueous solution (30 mL) containing the PDDA ($3.6 \times 10^{-3}$ mole) was reduced by freshly prepared sodium borohydride solution. A change of color from light yellow to pink was immediately observed. The average size of the PDDA-coated Au colloids in the dispersion is 4.8 nm, as revealed by particle size measurement.

Two samples of 15 and 20 bilayers of Au: PDDA/poly s-119 films demonstrated resistivities of $5.4 \times 10^{-6}$ and $5.6 \times 10^{-6}$, respectively.

While platinum and gold have been used to make conductive films, it should be understood that the process could be practiced with other conductive materials such as copper, aluminum, silver, etc. The chief requirement be that ionized conductive cluster be assemble in a multilayered film with layers of material having an opposite ionic charge.

Ultraviolet Light Blocking Film

In a typical preparation of cationic $TiO_2$ colloid, reagent grade $TiCl_4$ was slowly added to a flask containing 6 M aqueous HCL under vigorous stirring to make the resulting solution of 0.5 M in $TiCl_4$. The immediate formation of a transparent colloidal dispersion was observed after aging at 80° C. for 4 hours, and these solutions were observed to be stable for months. The particle size in the dispersion ranges from 2 to 4 nm and the average size was 3 nm as revealed by transmission electron microscopy.

Poly(sodium 4-styrenensulfonate) (PSS) was used as an anionic electrolyte.

The ultraviolet light blocking film was formed of multiple oppositely charged layers by the process of electrostatic self-assembly.

UV-vis spectroscopy was used to monitor the transmission as a function of the number of the bilayers. The transmission in the UV light range decreases progressively with an increasing number of bilayers, while only small changes occur in the visible region. Transmission drops from 66% for a 4-bilayer $TiO_2$ film coating to 97% for a 60-bilayer film coating at 190 nm.

Hard Coating $Al_2O_3$ Film

The fabrication of $Al_2O_3$/polymer multilayer films was carried out as follows in order to provide good film uniformity and larger pores between the substrate and the $Al_2O_3$ films, four bilayers of polymer films of PDDA (1%, v/v; $[C]_{NaCl}$=0.05 M) and PSS ($10^{-3}$ g/mol; $[C]_{NaCl}$=0.05 M) were deposited on the substrate. The slide was then immersed in a 10 mg/mol aqueous solution of $Al_2O_3$ colloids for five seconds, and rinsed extensively with water. Subsequently, the slide was dipped into the anionic solution of PSS for a minute, followed by thorough washing with water. By repetition of this simple two-step process in a cyclic fashion, the alternating layer-by-layer electrostatic self-assembly of one layer of $Al_2O_3$ nanoparticles and one layer of polymer molecules into multilayer films can be obtained, and in principle, there is no limit for a final thickness. The test samples reported in Table 1 below had the following thicknesses: A1 as deposited, A2 heated at 500° C. for two hours, A3 heated at 1000° C. for two hours.

The hardness and Young's modulus of three samples (an as-deposited specimen, and specimens sintered at 500° C. and 1000° C.) were measure using Berkovich type of indentor. Loads ranging from 100 μN to 2000 μN were used in the procedure. The resulting contact depths ranged from 20 nm to 200 nm. The average and standard deviations of the contact depth, reduced modulus, and hardness are shown in Table 1 below.

TABLE 1

| sample | sintering (° C.) | Contact Depth (nm) | Reduced Modulus (GPa) | Hardness (GPa) |
|---|---|---|---|---|
| A1 | As deposited | 123 ± 39 | 89 ± 25 | 1.1 ± 0.3 |
| A2 | 500 | 93 ± 27 | 109 ± 27 | 2.1 ± 0.8 |
| A3 | 1000 | 66 ± 22 | 102 ± 29 | 4.2 ± 2.2 |

$ZrO_2$ Film

The fabrication of $ZrO_2$ polymer composite films was carried out as follows. In order to provide a good film uniformity and larger pores between the substrate and the $ZrO_2$ films, four bilayers of polymer films of PDDA (1%, v/v; $[C]_{NaCl}$=0.05 M) and PSS ($10^{-3}$ g/mol; $[C]_{NaCl}$=0.05 M) were deposited on the substrate. The slide was then immersed in a 10 mg/mol aqueous solution of $ZrO_2$ colloids for five seconds, and rinsed extensively with water. Subsequently, the slide was dipped into the anionic solution of PSS for a minute, followed by thorough washing with water. By repetition of this simple two-step process in a cyclic fashion, the alternating layer-by-layer electrostatic self-assembly of one layer of $ZrO_2$ nanoparticles and one layer of polymer molecules into multilayer films can be obtained, and in principle, there is no limit for the final thickness. Table 2 shows hardness values of $ZrO_2$/polymer thin-film coatings. The thickness of the test samples reported in Table 2 are as follows: A1 as deposited, A2 heated at 400° C. for one hour, A3 heated at 900° C. for two hours.

TABLE 2

| Sample | sintering (° C.) | Vickers Hardness (GPa) | Young's Modulus (GPa) |
|---|---|---|---|
| A1 | as deposited | 2.24 | 51.77 |
| A2 | 400, 1 hour | 19.31 | 254.74 |
| A3 | 900, 2 hour | 25.13 | 285.43 |

$Al_2O_3/ZrO_2$ Film

The fabrication of $Al_2O_3$/PSS/$ZrO_2$/PSS composite films was carried out as follows. Cluster size measurements indicated mean diameters of 30 nm and 6 nm, respectively, for the alumina and zirconia clusters. First, four bilayers of ESAM films of poly(diallyldimethylammonium chloride) (PDDA) and PSS were deposited on 2.54 cm×2.54 cm silicon or 2.54 cm×7.62 cm glass slide substrate. Second, the slide was then immersed in a 40 mg/mol aqueous solution of $Al_2O_3$ colloids for approximately five seconds, and rinsed extensively with water for approximately one minute. Third, the slide was dipped into the anionic solution of PSS for 1, minute, followed aging by washing with water. Fourth, the slide was immersed into a 40 mg/mol aqueous solution of $ZrO_2$ colloids for five seconds, then washed with water. Fifth, the slide was dipped into the aqueous solution of PSS for 1 minute, followed by rinsing with water Repetition of the second through fifth steps led to the construction of Multilayer $Al_2O_3$/PSS/$ZrO_2$/PSS composite films. This process allows us to construct micron-thick films and to vary the stacking sequence and thus the percentage of $Al_2O_3$ and $ZrO_2$ layers. For this experiment, four hundred forty layers of $Al_2O_3$/PSS/$ZrO_2$/PSS composite films having a thickness of approximately 4.3 microns (estimated from the ellipsometry measurement), have been fabricated, although greater thicknesses are possible.

The sintering of the $Al_2O_3$/PSS/$ZrO_2$/PSS films was performed as follows. The sample prepared on the Si substrate was cut into two pieces. One piece was heated in air to 1200° C. at a constant 2° C./min heating rate, and held at that maximum temperature for two hours, then cooled naturally to room temperature. Table 3 shows hardness values of $Al_2O_3/ZrO_2$ film.

TABLE 3

| Sample | Sintering Temperature (° C.) | Vickers Hardness (GPa) | Young's Modulus (GPa) |
|---|---|---|---|
| A1 | As deposited | 1.13 | 72.3 |
| A2 | 1200 | 10.57 | 163.4 |

$Al_2O_3+ZrO_2$ Film

The fabrication of ($Al_2O_3+ZrO_2$ film)/PSS composite films was carried out as follows. First, three bilayers of ESAM films of poly(diallyldimethylammonium chloride) (PDDA) and PSS were deposited on a substrate. Then, the slide was then immersed in a mixture solution of 10 mg/mol aqueous solution of $Al_2O_3$ colloids and 10 mg/mol aqueous solution of $ZrO_2$ colloids for approximately five seconds, and rinsed extensively with water for approximately 1 minute. Subsequently, the slide was dipped into the anionic solution of PSS for 1 minute, followed again by washing with water. Repetition of the second and third steps led to the construction of multilayer ($Al_2O_3$ +$ZrO_2$ film)/PSS composite films.

It is apparent from the above description that the nature of the ceramic oxide can vary considerably with the practice of this invention. Other nanoparticles which may be employed include silicon, titania, and nitrides. Different ceramic oxides can be on alternating layers of material or combinations of two or more ceramic oxides can be used on the same layer.

Furthermore, the above description shows that the surface of the substrate can be laid up with alternating polymer layers prior to adding ceramic oxides or other nanoparticle layers depending on the needs of the manufacturers. This initial lay up can be eliminated or be enhanced to a greater number of layers.

Nanoclusters for Incorporation into Thin-Films

Different nanocluster of atoms and molecules may be self-assembled by this process, and the properties of the resulting multilayer films is determined by the species, size and morphology of the clusters and the long range order of the clusters and other molecules in the film. Unlike molecules, which may be considered to be "complete" building blocks of substances, in that they exist as materials that have physical properties and structure unique to their molecular nature, cluster are collections of atoms or molecules. They have properties that are distinctly different from those of their constituent atoms or molecules, as well as from bulk materials made from such atoms or molecules. Specifically, by controlling the size and morphology of such clusters, their electronic properties may be varied, thus allowing control over the electronic, optical, magnetic, photo electric, and other fundamental properties of thin and thick films and coatings formed by the clusters. Control over the electronic band gap structure and the interaction and coupling between the clusters further allows control over optical emission and absorption, mechanical, thermal, electrical and other properties.

Formation of Gold Nanoclusters

Gold nanoclusters may be prepared for self-assembly by the following process. Gold colloids protected by polymer coating may be prepared as follows. $HAuCl_4$ ($9 \times 10^{-3}$ mol. from Alfa AESAR) dissolved in aqueous solution (30 ml) containing the PDDA ($3.6 \times 10^{-6}$ mol) may be reduced using freshly prepared sodium borohydride solution. A change of color from light yellow to pink should be immediately observed. The borohydride solutions may be freshly prepared before each fabrication, so that degradation of borohydride into $BO_2$ is minimized. The average size of the PDDA-coated Au colloids in the dispersion should be approximately 4.8 nm and this distribution includes relatively few small (3.0 nm) and larger (6.4 nm particles, as revealed by particle size measurement (Zetasizer 3000, Malvern Instruments).

Such clusters may be used to form multilayered thin films by the Electrostatic self-assembly method, and such films may have electrical and thermal sheet conductivities on the order of those of bulk species of the same materials. In addition to the gold nanoclusters described here, silver, platinum, aluminum, nickel, copper and other small metal clusters may be used to obtain such behavior, which is due to the avoidance of defects and impurities in the films by the Electrostatic self-assembly process, and the cluster-cluster tunneling quantum mechanical behavior.

Formation of Zirconia Nanoclusters

Additionally, metal oxide clusters such as zirconia may be purchased commercially. Such clusters may be used to form thin films with ultrahard mechanical behaviors (Vickers microhardness as high as 30 GPa in our tests) and controlled refractive index. Similarly, the use of other similar other metal oxide species such as alumina or titania may be used to obtain variation of hardness and scratch resistance as well as refractive index, through variation of cluster size and species. We have obtained a variation of Vickers hardness in films processed at room temperature from 1 to 30 GPa by using such different cluster, and refractive indices from approximately 1.6 to 1.9. A larger range of index may be obtained by incorporating the clusters into alternating layers of low index polymers, using clusters such as $SiO_2$, $Al_2O_3$, $Fe_3O_4$, $Fe_2O_3$, $CaCO_3$, $CaF_2$, $TiO_2$, CuO and others or by selectively removing specific clusters or polymers by etching, leaving vacancies filled by air thus reducing the refractive index.

Fullerene Nanoclusters

Nanoclusters of fullerenes, so-called "Buckeyballs", may be formed for the formation of multilayer thin films as described in *J. Org. Chem.* 1994, 59, 3960. Such Fullerene clusters and similar cage structured molecular clusters may be used in thin film electronic, optical, and optoelectronic devices as charge transfer enhancing elements to enhance the behavior of such devices and to form noncentrosymmetric structures and films. In our lab, we have formed Fullerene cluster films as thick as one micron with very good uniformity, using the same procedures described above.

A wide variety of charged polymeric material may be used as alternativing layers with nanoclusters, "Buckeyballs", metals, ceramics, etc. within the practice of this invention including polyelectrolytes, and ionic polymers.

While the invention has been described in terms of its preferred embodiments, those skilled in the art will recognize that the invention can be practiced with modification within the spirit and scope of the appended claims.

We claim:

1. A coating for a substrate comprised of multiple oppositely charged layers of at least a first and a second material held together by electrostatic charges and positioned on a substrate, each layer being 0.1 nm to 100 nm thick, wherein the first material comprises clusters and the second material is a polymer.

2. The coating of claim 1 wherein said polymer is selected from the group consisting of a polyimide, poly (dillalydimethylammonium chloride), polymer dye, poly s-119, and poly(sodium 4-styrenesulfonate).

3. The coating of claim 1 wherein said clusters are a metal.

4. The coating of claim 1 wherein said clusters are a metal oxide.

5. The coating of claim 1 wherein said clusters are a ceramic.

6. The coating of claim 1 wherein said clusters are a ceramic oxide.

7. The coating of claim 1 wherein said clusters are a fullerene.

8. The coating of claim 1 wherein said clusters are caged structured molecules.

9. The coating of claim 1 wherein said clusters have a predetermined electronic band gap.

10. The coating of claim 1 wherein the aggregate thickness of said multiple oppositely charged layers ranges from 1 nm to 1 mm.

11. A coating for a substrate comprised of multiple oppositely charged layers of at least a first and a second material held together by electrostatic charges and positioned on a substrate, each layer being 0.1 nm to 100 nm thick, wherein said first and second materials are both clusters.

12. The coating of claim 11 wherein said clusters in said first and second material are different from one another.

13. The coating of claim 11 wherein said clusters in said first and second material are identical except for a surface charge.

14. The coating of claim 12 wherein at least one of said first and second materials are clusters of metals.

15. The coating of claim 12 wherein at least one of said first and second materials are clusters of a metal oxide.

16. The coating of claim 12 wherein at least one of said first and second materials are clusters of a ceramic.

17. The coating of claim 12 wherein at least one of said first and second materials are clusters of a ceramic oxide.

18. The coating of claim 12 wherein at least one of said first and second materials are clusters of a fullerene.

19. The coating of claim 12 wherein at least one of said first and second materials are clusters of a caged structured molecule.

20. The coating of claim 12 wherein at least one of said first and second materials are clusters that have a predetermined electronic band gap.

21. The coating of claim 12 wherein the aggregate thickness of said multiple oppositely charged layers ranges from 1 nm to 1 mm.

22. The coating of claim 13 wherein at least one of said first and second materials are clusters of metals.

23. The coating of claim 13 wherein at least one of said first and second materials are clusters of a metal oxide.

24. The coating of claim 13 wherein at least one of said first and second materials are clusters of a ceramic.

25. The coating of claim 13 wherein at least one of said first and second materials are clusters of a ceramic oxide.

26. The coating of claim 13 wherein at least one of said first and second materials are clusters of a fullerene.

27. The coating of claim 13 wherein at least one of said first and second materials are clusters of a caged structured molecule.

28. The coating of claim 13 wherein at least one of said first and second materials are clusters that have a predetermined electronic band gap.

29. The coating of claim 13 wherein the aggregate thickness of said multiple oppositely charged layers ranges from 1 nm to 1 mm.

\* \* \* \* \*

UNITED STATES PATENT AND TRADEMARK OFFICE
CERTIFICATE OF CORRECTION

PATENT NO. : 6,316,084 B1
DATED : November 13, 2001
INVENTOR(S) : Claus et al.

It is certified that error appears in the above-identified patent and that said Letters Patent is hereby corrected as shown below:

Title page,
Item [73], Assignee, change from "Nanosonic, Inc." to -- Virginia Tech Intellectual Properties --

Signed and Sealed this

Twenty-fourth Day of August, 2004

JON W. DUDAS
*Director of the United States Patent and Trademark Office*